United States Patent [19]
Greenwood et al.

[11] 3,815,633
[45] June 11, 1974

[54] FLUID FLOW CONTROL MANIFOLDS AND DEVICES

[75] Inventors: Roger Greenwood, Valencia; Leo William Van Bellen, Burbank, both of Calif.

[73] Assignee: International Telephone and Telegraph Corporation, New York, N.Y.

[22] Filed: Feb. 12, 1973

[21] Appl. No.: 331,630

Related U.S. Application Data

[62] Division of Ser. No. 230,891, March 1, 1972, Pat No. 3,747,623.

[52] U.S. Cl. ................. 137/625.27, 137/625.65
[51] Int. Cl. .................................. F16k 11/02
[58] Field of Search ............... 251/84, 85, 138, 129; 137/625.64, 625.65, 625.27

[56] References Cited
UNITED STATES PATENTS

| | | | |
|---|---|---|---|
| 2,834,368 | 5/1958 | Gray | 137/271 |
| 3,294,030 | 12/1966 | Fox | 137/625.64 X |
| 3,303,854 | 2/1967 | Churchill | 137/625.65 |
| 3,432,140 | 3/1969 | Ray | 251/129 |
| 3,534,772 | 10/1970 | Stampfli | 137/625.65 X |
| 3,538,954 | 11/1970 | Fagerlie | 251/129 X |
| 3,542,333 | 11/1970 | Stampfli | 251/85 |
| 3,559,686 | 2/1971 | Hoffman | 137/625.64 |
| 3,677,298 | 7/1972 | Greenwood et al. | 137/625.64 |

Primary Examiner—Henry T. Klinksiek
Assistant Examiner—Robert J. Miller
Attorney, Agent, or Firm—A. Donald Stolzy

[57] ABSTRACT

A valve manifold and a modular valve which may be used in the assembly thereof or used separately therefrom. When the valve is mounted in any one of four positions, four different combinations of functions are possible. No additional parts are required to mount the valve in any of the four positions. All valves may be identical or some may be normally open and some normally closed. Half O-ring grooves permit the use of two positions. Mounting symmetry is required in any case. Two seals permit either pneumatic or hydraulic use. Tandem operation of two valves with a single solenoid is accomplished through the use of rods slidable through the valve body. Higher pressure ratings may be achieved in alternative embodiments.

1 Claim, 10 Drawing Figures

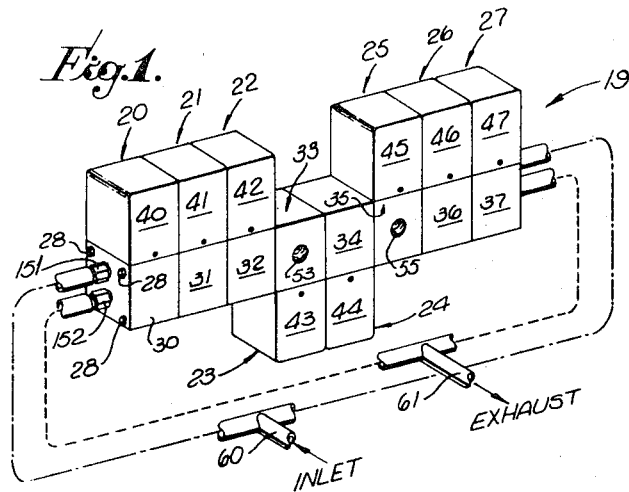
Fig.1.
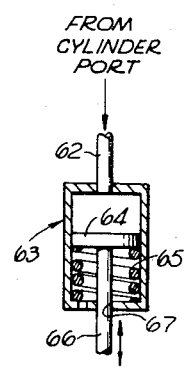
Fig.2.
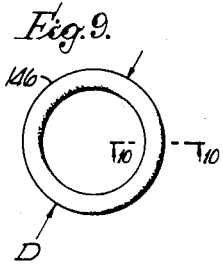
Fig.9.
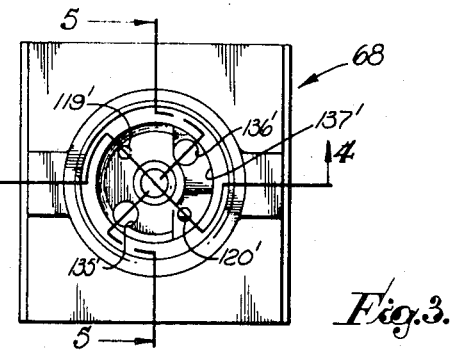
Fig.3.
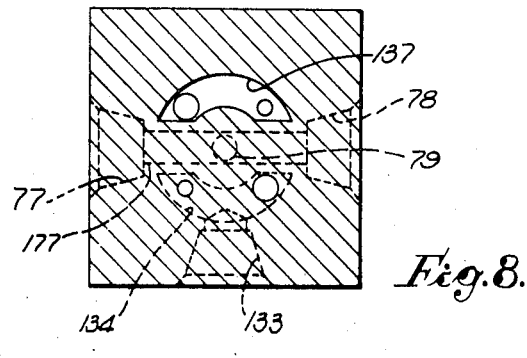
Fig.8.
Fig.10.

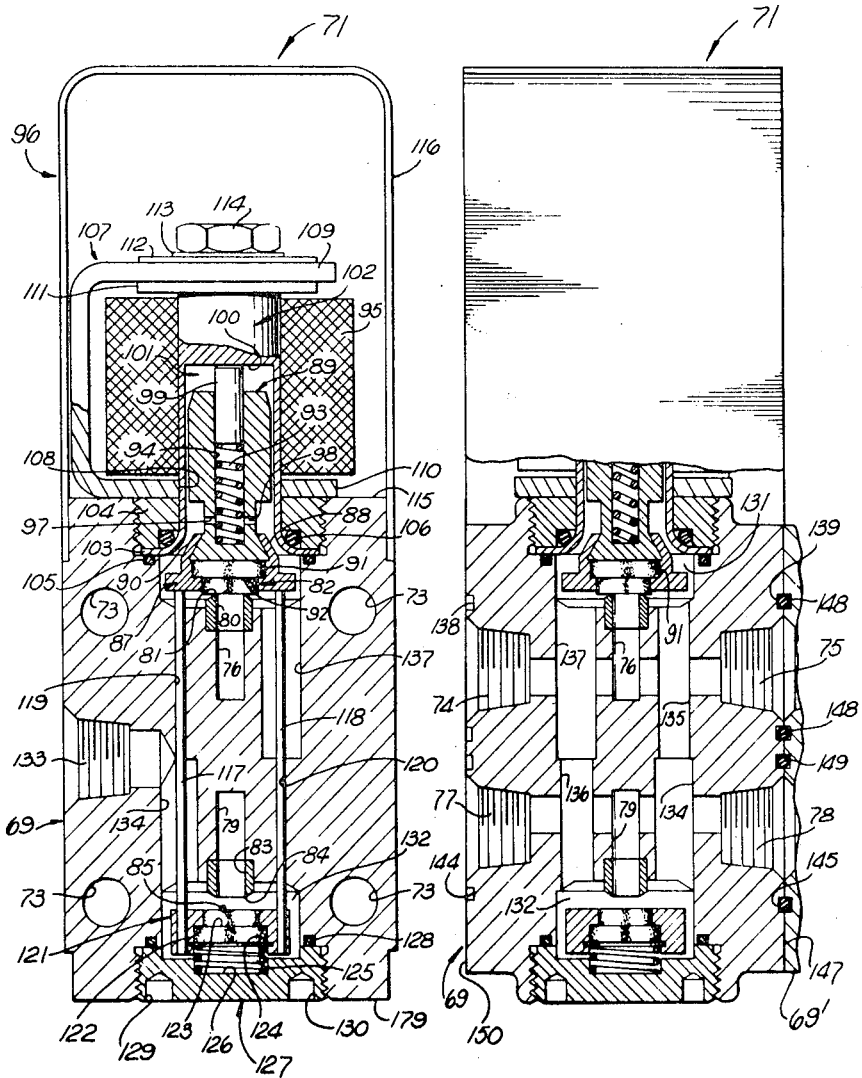

FLUID FLOW CONTROL MANIFOLDS AND DEVICES

This application is a division of copending parent application Ser. No. 230,891 filed Mar. 1, 1972, now U.S. Pat. No. 3,747,623. The benefit of the filing date of said copending application Ser. No. 230,891 is, therefore, hereby claimed for this application.

BACKGROUND OF THE INVENTION

This invention relates to the fluid flow control art, and more particularly, to a valve manifold, and a valve which may be used within or without the manifold.

Although the present invention is new, the broad idea of manifolding universal type three-way modular valves is old in the art. However, such manifolds require a spacer between valves and the location of a seal in one of two alternate positions in two respective holes through the spacer. Such prior art manifolds are suitable for use in pneumatic systems but are unsuitable for use in hydraulic systems.

Prior art valve manifolds lack versatility in a number of other ways as well. For example, the exhaust port from each valve body can be located in only one position. Further, a prior art modular valve can be operated to perform only one function. That is, it can be used only as a normally closed valve or only as a normally open valve, but not as either one.

SUMMARY OF THE INVENTION

In accordance with the present invention, the above-described and other disadvantages of the prior art are overcome by providing a new threeway valve including two valves operated in tandem, or equivalent.

It is a feature of the invention that one of the tandem valves is operated by the other through rods slidable in holes in the valve body. This arrangement is similar to, but different from, that disclosed in copending application Ser. No. 101,330 filed Dec. 24, 1970, by R. Greenwood and J. P. Etcheverry for VALVE, now U.S. Pat. No. 3,677,298.

It is another feature of the invention that the same said new valve or another valve can be employed as a modular valve, wherein the modular valve may be rotated about a first axis to reverse the position of the cylinder port thereof. Port alignment and port symmetry of one type are required in this case. A half O-ring groove or equivalent is also required.

It is still another feature of the invention that a modular valve is provided which may be rotated about the first axis or a second axis perpendicular thereto to convert the modular valve from normally open to normally closed or vice versa. This also requires port symmetry and alignment of a type which may be the same as or different from that of said one type. In any case, one embodiment of the modular valve of the present invention can be left alone or rotated 180° about either one or both of said first and second axes to any one of four positions. This valve then performs any one of four combinations of functions. For example, the four functions may be: (1) normally closed—cylinder port right, (2) normally closed—cylinder port left, (3) normally open—cylinder port right, and (4) normally open—cylinder port left.

A further feature of the invention resides in the use of at least two seals. The manifold and valve of the present invention may, for this reason, be employed in hydraulic as well as pneumatic systems.

It is still another feature of the present invention that one modular valve thereof may be easily mounted in either a normally open or a normally closed position.

The above-described and other advantages of the present invention will be better understood from the following detailed description when considered with the accompanying drawings.

BRIEF DESCRIPTION OF THE DRAWINGS

In the drawings which are to be regarded as merely illustrative:

FIG. 1 is a perspective view of a manifold including a plurality of solenoid valves;

FIG. 2 is a vertical sectional view, partly in elevation, indicating how the position of a piston may be controlled by a three-way valve;

FIG. 3 is a top plan view of a valve body constructed in accordance with the present invention;

FIG. 4 is a vertical sectional view of a normally closed solenoid valve having the body shown in FIG. 3 and taken on the line 4—4 shown in FIG. 3;

FIG. 5 is a vertical sectional view of the valve shown in FIG. 4 but taken on the line 5—5 shown in FIG. 3;

FIG. 8 is a transverse sectional view of the solenoid valve taken on the line 8—8 shown in FIG. 7;

FIG. 9 is a top plan view of a conventional rubber O-ring seal; and

FIG. 10 is a sectional view of the seal taken on the line 10—10 shown in FIG. 9.

DESCRIPTION OF THE PREFERRED EMBODIMENTS

Figure 6:
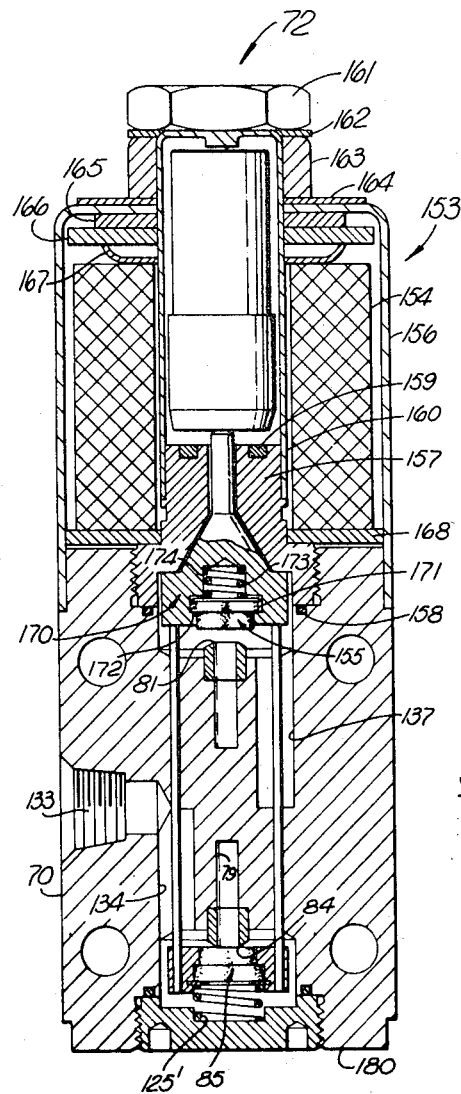
FIG. 6 is a view similar to FIG. 4 of a normally open solenoid valve.

In FIG. 1, a valve manifold 19 is illustrated including solenoid valves 20, 21, 22, 23, 24, 25, 26 and 27. All of these valves may be identical. However, note will be taken that the orientation of solenoid valves 23, 24 and 25 are different from those of solenoid valves 20, 21, 22, 26 and 27. Solenoid valves 20, 21, 22, 26 and 27 are all oriented the same way. Solenoid valve 23 is oriented different from any of the other solenoid valves illustrated in FIG. 1. The same is true of solenoid valves 24 and 25.

All of the solenoid valves illustrated in FIG. 1 are fixed together by four bolts 28, only three of which are shown in FIG. 1.

The valves 20-27 are modular valves. Each one may, thus, be oriented in any one of four positions independent of the orientation of the others.

Solenoid valves 20, 21, 22, 23, 24, 25, 26 and 27 have valve bodies 30, 31, 32, 33, 34, 35, 36 and 37, respectively. Solenoid valves 20, 21, 22, 23, 24, 25, 26 and 27 also have solenoid actuators 40, 41, 42, 43, 44, 45, 46 and 47, respectively. Each of the actuators 40-47 may be independently actuated to move a piston for control purposes, for example. That is, the piston may open or close a much larger valve or do some other work.

Each of the valve bodies 30-37 has a cylinder port. However, due to the orientation of the solenoid valves in FIG. 1, only two cylinder ports are shown. These ports are ports 53 and 55 in valve bodies 33 and 35, respectively.

As will be explained, each valve body shown in FIG. 1 has a pair of inlet ports and a pair of exhaust ports. The inlet ports are connected to a common inlet pipe 60. The exhaust ports are connected to a common exhaust pipe 61. Thus, as shown in FIG. 2, if a pipe 62 connected from cylinder port 53 of valve body 33 in one position of valve 23, hydraulic fluid under pressure is admitted to the interior of cylinder 63 above piston 64 to depress piston 64 and do the desired work. On the other hand, with the valve 23 in its other position, the interior of the cylinder 63 above piston 64 is exhausted through pipe 61, and a spring 65 returns piston 64 to its uppermost position. A shaft 66 is slidably guided through a hole 67 in cylinder 63 and is connected to whatever device that it is employed to operate.

In FIG. 1, note will be taken that all of the cylinder ports of valve bodies 30, 31, 32, 34, 36 and 37 are on the sides opposite those shown in FIG. 1. It is, therefore, an advantage of the invention that the cylinder ports may be employed on either side of the manifold 19.

The substantial versatility of the manifold 19, shown in FIG. 1, may be better understood from the following further description. If each one of the valves shown in FIG. 1 is a normally closed valve in one position, it may be converted to a normally open valve in another position or orientation. The reverse is also true. That is, if it is a normally open valve in one position, it may be converted to a normally closed valve in another position. The reason why it may be desirable to locate one of the valves shown in FIG. 1 in any one of four positions is that there are four combinations of cylinder port positions and open and closed positions. That is, for example, a cylinder port right position with a normally closed position, a cylinder port right position with a normally open position, a cylinder port left position with a normally closed position, and a cylinder port left position with a normally open position.

For example, assume that valves 20, 21, 22, 26 and 27 are normally closed in the cylinder port left position. Then, solenoid valve 23 is in a normally open cylinder port right position. Solenoid valve 24 is then in a normally open cylinder port left position. Solenoid valve 25 is in a normally closed cylinder port right position. The last four sentences are also true if each of the phrases "normally closed" is replaced with the phrase "normally open" and vice versa.

Figure 7:
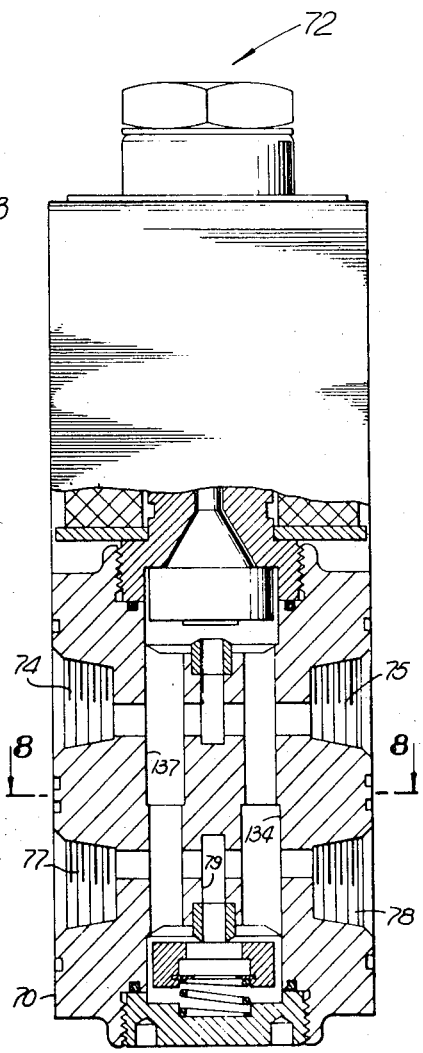
FIG. 7 is a view similar to FIG. 5 but of the normally open solenoid valve of FIG. 6.

A valve body 68 is shown in FIG. 3. All of the valve bodies shown in FIG. 1 may be identical to valve body 68, if desired. The same is true of valve bodies 69 and 70 shown in FIGS. 4, 5, 6 and 7. A valve 71 is shown in FIGS. 4 and 5. A valve 72 is shown in FIGS. 6 and 7. Valve 71 is a normally closed valve when oriented in the position of valve 20 shown in FIG. 1. Valve 72 is normally open when located in the position of valve 20 in FIG. 1.

If desired, all of the valves shown in FIG. 1 may be identical to valve 71. Alternatively, all the valves shown in FIG. 1 may be identical to valve 72. Still further, some of the valves shown in FIG. 1 may be identical to valve 71 and other of the valves shown in FIG. 1 may be identical to valve 72.

As may be evident, as many valves may be employed in one manifold as desired. For example, one valve may be employed, or two or more or any number of valves may be employed including three, four, five, six, seven, eight or more valves.

As shown in FIG. 4, valve 71 has four holes 73 therethrough through which the four bolts 28 project and clamp the valve bodies together.

As shown in FIG. 5, valve body 69 has two inlet ports 74 and 75 which are in communication with each other. Fluid under pressure may be supplied to either one of the inlet ports 74 and 75. This fluid under pressure will then travel through a passage 76 in valve body 69. Both inlet ports 74 and 75 are in communication with each other and with passage 76. Part of the versatility of valve 71 resides in the use of the two inlet ports 74 and 75. Moreover, when a plurality of such valves are clamped together in a manifold such as manifold 19 with or without valves such as valve 72, inlet pressure is communicated to all valves simultaneously. This is also true of pressure supplied to two exhaust ports 77 and 78 in valve body 69, shown in FIG. 5. Thus, both exhaust ports 77 and 78 are in communication with each other and with a passage 79.

A hollow cylinder 80 is fixed to valve body 69 and provides a valve seat at 81 against which a rubber disc 82 rests to close the opening in cylinder 80. The opening in cylinder 80 is in communication with passage 76, as shown in FIG. 4.

Similarly, a cylinder 83 is fixed to valve body 69 providing a valve seat at 84 against which a rubber disc 85 can rest, cylinder 83 being hollow and having its interior, which is open at both ends, in communication with passage 79.

An aluminum fitting 87 is rolled over the lower flaring end 88 of a ferromagnetic plunger 89 at 90. Fitting 87 has a flange 91 which abuts a flange 92 on disc 82 to retain it tightly against the lower end 88 of plunger 89. A helically coiled spring 93 is positioned in a hole 94 in plunger 89 to maintain disc 82 normally in engagement with valve seat 81 when a solenoid winding 95 around plunger 89 is deenergized.

Valve 71 includes an actuator 96. Actuator 96 may include winding 95 and other structures shown in FIG. 4.

Plunger 89 has vent holes 97 and 98 between the exterior thereof and hole 94. Plunger 89 is slidable on a pin 99 that abuts the upper end 100 of a recess 101 inside a member 102. Member 102 has a flared flange 103 which is pressed against valve body 69 and clamped thereto by a threaded member 104. An O-ring seal 105 is provided between flange 103 and valve body 69. An O-ring seal 106 is provided between flange 103 and member 104. A ferro-magnetic yoke 107 has holes 108 through which member 102 projects. Winding 95 surrounds member 102 between the upper and lower legs of yoke 107 at 109 and 110, respectively.

Washers are provided at 111, 112 and 113, washer 113 being a lock washer. A nut 114 is threaded onto a reduced diameter threaded upper end of member 102 to hold the assembly above the top 115 of valve body 69 in a fixed position except for the movement of plunger 89 and spring 93 therein. A cover 116 is provided for actuator 96, cover 116 being fixed relative to valve body 69.

Energization of winding 95 permits disc 82 to lift off of valve seat 81 and permits disc 85 to rest on valve seat 84 for the following reasons. When winding 95 is energized, solenoid 89 rises to lift disc 82 off of valve seat 81. Rods 117 and 118 which are slidable respectively in holes 119 and 120 in valve body 69, abut the lower surface of fitting 87. Rods 117 and 118 are press fit in a carrier 121. Rods 117 and 118 are, thus, fixed relative to carrier 121. Carrier 121 has a flange 122 which retains disc 85 therein by engagement thereof with a flange 123 on valve disc 85. A snap ring 124 in carrier 121 prevents downward movement of valve disc 85 relative to carrier 121. A helically coiled spring 125 is then trapped between an upper surface 126 of a closure member 127 and snap ring 124. Closure member 127 is threaded into valve body 69 and sealed therewith by an O-ring seal 128, closure member 127 having spanner wrench holes 129 and 130.

When winding 95 is deenergized, the force of spring 93 is such that the force of spring 125 is overcome and valve disc 82 is placed in engagement with valve seat 81, and valve disc 85 does not touch and is spaced from seat 84. However, when winding 95 is energized, the magnetic force of attraction produced by winding 95 moves plunger 89 upwardly, as viewed in FIG. 4, to space disc 82 from valve seat 81. This relieves the force transmitted by rods 117 and 118 to carrier 121 and permits spring 125 to cause valve disc 85 to engage seat 84 and close off the interior of cylinder 83.

In FIG. 4, note will be taken that a chamber exists at 131 which surrounds valve disc 82 and fitting 87. Similarly, a chamber 132 always surrounds valve disc 85 and carrier 121. Both of the chambers 131 and 132 are always in communication with each other and with a cylinder port 133. Chamber 132 is in communication with cylinder port 133 through a passage 134. However, chambers 131 and 132 are in communication with each other through holes 119 and 120. Moreover, chambers 131 and 132 are also in communication with each other through passages 135 and 136, shown in FIG. 5. Comparison of FIGS. 3, 4 and 5 will reveal that valve bodies 68 and 69 have a great deal of symmetry. Passage 134 is kidney shaped. Hole 119 and passage 135, thus, both open into passage 134. A passage 137 is also provided at the opposite end of the body. Passage 137 is also kidney shaped and may be identical in shape and size to passage 134. Both hole 120 and passage 136 open into passage 137.

Considerable confusion in reading the drawings may be avoided by carefully noting that the section lines 4—4 and 5—5, shown in FIG. 3, are not straight lines. For example, starting from the left-hand side of the section line 4—4 in FIG. 3, the section is straight through the middle of the valve body 68. The section then abruptly jumps 45 degrees in a clockwise direction through the center of the valve and in a counterclockwise direction 45° through the center of the right-hand side of the valve body 68. Cylinder port 133 may be centrally located, but not necessarily. Since kidney-shaped passage 134 extends around the plug a considerable distance, e.g. at least 45° on each side of the bore axis of cylinder port 133, ample interception is created to receive inlet pressure through passage 134. Rods 117 and 118, however, are located on a 45° line. Holes corresponding to holes 119 and 120 in FIG. 4 are indicated at 119' and 120' in FIG. 3. Passages corresponding to passages 135 and 136 in FIG. 4 are indicated at 135' and 136' in FIG. 3. A kidney-shaped passage 137' is indicated in FIG. 3 which corresponds to kidney-shaped passage 137 in FIGS. 4 and 5.

Due to the fact that the section 4—4 is taken looking upwardly as viewed in FIG. 3, and section 5—5 is taken looking to the right as viewed in FIG. 3, passage 134 is shown to the left of passage 137 in FIG. 4, and passage 137 is shown to the left of passage 134 in FIG. 5.

As stated previously, ports 74 and 75, shown in FIG. 5, are in communication with one another. However, due to the 45° rotation of the section lines shown in FIG. 3, it is to be especially noted that neither of the ports 74 and 75, shown in FIG. 5, are in communication with any of the passages 134, 135, 136 and 137. The same is true of ports 77 and 78.

Ports 74, 75, 77 and 78 have O-ring grooves 138, 139, 144 and 145 spaced therefrom, respectively, but concentric therewith. If desired, each of the O-ring grooves 138-145 may be of the same shape and size and have a disc approximately equal to one-half the small diameter of an O-ring.

A conventional O-ring 146 is shown in FIG. 9 having a diameter indicated at D. A sectional view of the O-ring 146 is shown in FIG. 10 having a diameter, $d$. The dimension, $d$, is hereby defined for use herein and in the claims to be the small diameter of an O-ring.

When joined together, as described previously, a valve body 69' having an actuator mounted thereon may be clamped to the right-hand face 147 of valve body 69, as shown in FIG. 5, with O-rings at 148 and 149. A valve body may, thus, be clamped to either the right-hand side 147 or the left-hand side 150 of valve body 69, as shown in FIG. 5. Alternatively, valve bodies may be clamped to both sides of valve body 69 with suitable O-rings provided wherever one side of one valve body is clamped to one side of another valve body. A manifold may be created such as manifold 19 of any length in this manner.

If desired, all ports the same as or similar to ports 74, 75, 77 and 78 may or may not be threaded. Any such threading may be employed to connect conventional fittings such as indicated at 151 and 152 in FIG. 1. The same is true of the threading of cylinder port 133, shown in FIG. 4.

In FIG. 4, in the position shown, spring 93 is always in compression.

In FIG. 6, valve 72 may be identical to valve 71 including and below valve seat 81. However, valve 72 includes an actuator 153 having a solenoid winding 154 which, when deenergized, permits a valve disc 155 to be spaced from valve seat 81.

Actuator 153 includes a housing 156 which is fixed to valve body 70. A member 157 is threaded into the top of valve body 70 and sealed thereto by an O-ring 158. Member 157 carries a shading ring 159 fixed thereto. A cover 160 is fixed to member 157. A nut 161 is threaded to cover 160 and holds down the assembly including spacers 162, 163 and 164; housing 156; spacers 165, 166 and 167; winding 154 and spacer 168.

A ferromagnetic plunger 169 is slidable in cover 160 to depress the upper end of a member 170 slidable in member 157. Member 170 has a flange 171 which abuts a flange 172 on disc 155 to retain disc 155 therein. A spring 153 is located in a recess 174 in member 170 to bias disc flange 172 against member flange 171. Spring 173 permits overtravel of member 170 when disc 155 engages valve seat 81.

The section shown in FIG. 8 is taken through FIG. 7 as though the view of FIG. 7 was a section 5—5 in FIG. 3 without the 45 degree rotation. Note that kidney-shaped passages 134 and 137 in FIG. 8 again correspond respectively to passages 134' and 137' in FIG. 3. Exhaust ports 77 and 78 are shown in FIG. 8 connected by a passage 177 which does not intercept passages 134 and 137. The passage 79 of FIG. 4 and 5 is again shown in FIGS. 6, 7 and 8. Cylinder port 133 is shown in FIGS. 4, 6 and 8.

OPERATION OF THE VALVE SHOWN IN FIGS. 4 AND 5

When winding 95 is deenergized, spring 93 keeps valve disc 82 resting on seat 81 and valve disc 85 spaced from valve seat 84, spring 93 being sufficiently strong to overcome the force of spring 125.

When winding 95 is energized, plunger 89 is moved upwardly. Member 87, fixed to plunger 89, then carries valve disc 82 away from and spaced from valve seat 81, and allows spring 125 to cause valve disc 85 to engage and close off the opening in cylinder 83, valve disc 85 then resting against valve seat 84.

When winding 95 is deenergized after being energized, spring 93 returns valve disc 82 into engagement with valve seat 81 and moves valve disc 85 downwardly away from valve seat 84 in spaced relation thereto.

OPERATION OF THE VALVE SHOWN IN FIGS. 6 AND 7

When winding 154 is deenergized, spring 125' is adequate to keep valve disc 85 in engagement with valve seat 84, and to hold valve disc 155 spaced from valve seat 81.

When winding 154 is energized, plunger 169 lowers and causes member 170 to bring valve disc 155 into engagement with valve seat 81, spring 173 allowing for overtravel of member 170. At the same time, valve disc 85 is lowered and spaced from valve seat 84.

After being energized, if winding 154 is deenergized, spring 125' moves valve discs 85 and 155 again to the positions shown in FIG. 6.

By turning valve 71 upside down in a manifold, ports 77 and 78 can be used as inlet ports and ports 74 and 75 may be used as exhaust ports. The same is true of valve 72 shown in FIG. 7. Valves 71 and 72 may, thus, be described as universal valves. The pressure rating of valve 85 in FIG. 4 may be a predetermined rating the same as that of valve 82. Similarly, in FIG. 6, both of valves 85 and 155 may have the same said predetermined rating. However, the pressure rating of any one of these valves may be made higher than said predetermined rating and higher than that of another of the valves by making one of the springs 93, 125 and 125' stronger or weaker. This may be a desirable alternative when all the ports 74 and 75 disclosed herein are to be used only as inlet ports. The same is true when all such ports are to be used only as exhaust ports.

In FIG. 4, by making spring 125 weaker or spring 93 stronger, the pressure rating of valve 82 goes up and the pressure rating of valve 85 goes down. However, if valve 85 is always used for exhaust, it does not need a high pressure rating because cylinder pressure helps to keep it closed anyway.

Conversely, in FIG. 4, by making spring 125 stronger or spring 93 weaker, the pressure rating of valve 85 goes up and the pressure rating of valve 82 goes down. However, if valve 85 is always used as the inlet valve and valve 82 as the exhaust valve, the lower pressure rating of valve 82 does not matter because the cylinder pressure, again, helps to keep it closed.

The two immediately preceding paragraphs apply analogously to valve 72 shown in FIGS. 6 and 7. The pressure ratings of valves 85 and 155 in FIG. 6 may be made unequal with either one being higher than the other by making spring 125' either stronger or weaker, respectively.

It is to be noted that the present invention may be practiced by locating a pair of aligned inlet ports and a pair of aligned exhaust ports in positions such that the bore axes thereof both lie in a horizontal plane rather than a vertical plane as viewed in FIGS. 4, 5, 6 and 7.

In another alternative, valve bodies 69 and 70 may have cylinder ports in the bottoms 179 and 180 thereof, respectively, as shown in FIGS. 4 and 6, respectively.

What is claimed is:

1. A three-way valve comprising: a valve body having first, second and third ports; a first valve seat having an opening therethrough in communication with said first port; a second valve seat having an opening therethrough in communication with said second port; first and second valves guided in said body in a manner to be moved into and out of engagement with said first and second valve seats, respectively, to close and to open said first and second valve seat openings, respectively, said valves having a common substantially symmetrical axis extending in the directions of movement thereof, said body having first and second chambers outside said openings surrounding and spaced from said first and second valves, respectively, said chambers being in communication with each other and with said third port; means actuable to operate said first valve, said body having a plurality of holes therethrough parallel to and substantially symmetrical about the said axis of said valves; and a rod for each of said holes mounted between said valves and slidable through said holes, said rods causing said valves to move in tandem by opening said second valve when said first valve is closed and vice versa, said rods engaging both of said valves at positions spaced a radial distance from the axis of said valves greater than the radial distance each corresponding seat is spaced from said axis; said holes and rods being cylindrical, there being two rods and two holes, said first and second ports having parallel bore axes lying in a first plane through the axis of said valves, said holes having axes lying in a second plane disposed at an angle of approximately 45° relative to said first plane and passing through the axis of said valves, said body having two cylindrical passageways disposed on opposite sides of the axis of said valves equidistant from the axis of said valves, said passageways having axes lying in a third plane normal to said second plane and passing through the axis of said valves, each of said passageways being in communication with both of said chambers; said first valve moving toward said second chamber when it moves toward said first seat, said first valve including a member, a valve element movably guided in said member, a first spring mounted in said member in a position to bias said first valve element toward said first seat, said member including stop means to prevent movement of said valve element toward said first seat beyond a predetermined limit, a second spring mounted in said body tending to bias said second valve closed, said second spring normally holding said second valve closed and said first valve open, and operator means actuable to close said first valve against the force of said second spring, said first spring allowing said member to overtravel said first seat when said operator means is actuated, said rods being fixed to said second valve and abutting said first valve.

* * * * *